United States Patent
Chauvin

(10) Patent No.: US 9,314,758 B2
(45) Date of Patent: Apr. 19, 2016

(54) DEVICE FOR NEUTRALIZING ACID CONDENSATES

(75) Inventor: Antoine Chauvin, Champigny-sur-Marne (FR)

(73) Assignee: SAUERMANN INDUSTRIE SA, Chevry Cossigny (FR)

(*) Notice: Subject to any disclaimer, the term of this patent is extended or adjusted under 35 U.S.C. 154(b) by 146 days.

(21) Appl. No.: 14/009,725

(22) PCT Filed: Mar. 29, 2012

(86) PCT No.: PCT/EP2012/055734
§ 371 (c)(1),
(2), (4) Date: Dec. 10, 2013

(87) PCT Pub. No.: WO2012/136577
PCT Pub. Date: Oct. 11, 2012

(65) Prior Publication Data
US 2014/0193308 A1    Jul. 10, 2014

(30) Foreign Application Priority Data
Apr. 7, 2011 (FR) .................................... 11 53048

(51) Int. Cl.
| | |
|---|---|
| *B01J 19/00* | (2006.01) |
| *B01J 19/24* | (2006.01) |
| *B01J 19/30* | (2006.01) |
| *B01J 8/00* | (2006.01) |
| *B01J 8/02* | (2006.01) |
| *B01J 35/00* | (2006.01) |
| *B01J 35/02* | (2006.01) |
| *C02F 1/66* | (2006.01) |
| *C02F 1/68* | (2006.01) |
| *F24H 8/00* | (2006.01) |
| *C02F 1/00* | (2006.01) |

(52) U.S. Cl.
CPC ................. *B01J 8/0257* (2013.01); *C02F 1/66* (2013.01); *C02F 1/688* (2013.01); *F24H 8/006* (2013.01); *C02F 2201/006* (2013.01); *Y02B 30/106* (2013.01)

(58) Field of Classification Search
CPC .............. B01J 8/00; B01J 8/02; B01J 8/0242; B01J 8/0257; B01J 19/00; B01J 19/24; B01J 19/30; B01J 35/00; B01J 35/02; C02F 1/00; C02F 1/66
See application file for complete search history.

(56) References Cited

FOREIGN PATENT DOCUMENTS

| | | | |
|---|---|---|---|
| DE | 3540164 A1 | * | 5/1987 |
| DE | 8901726 U1 | | 3/1989 |
| DE | 4010321 A | * | 10/1991 |
| DE | 4422430 A1 | * | 1/1996 |
| FR | 2930542 | | 4/2008 |

OTHER PUBLICATIONS

Machine translation of DE 4010321 A, which was published on Oct. 2, 1991.*

(Continued)

*Primary Examiner* — Natasha Young
(74) *Attorney, Agent, or Firm* — David D. Brush; Westman, Champlin & Koehler, P.A.

(57) ABSTRACT

A device for neutralizing acid condensates includes a condensate collection tank and a cartridge containing a reactant for neutralizing the acids. The cartridge has a condensate inlet opening and a condensate outlet opening. The cartridge is placed at least partly in the tank so that the outlet opening is below a minimum level of liquid in the tank.

15 Claims, 4 Drawing Sheets

(56) References Cited

OTHER PUBLICATIONS

Machine translation of DE 4422430 A1, which is provided in IDS filed Oct. 29, 2014 and published Apr. 1, 1996.*
Machine trnaslation of FR 2930542 A1, which is provided in IDS filed Oct. 29, 2014 and published Oct. 30, 2009.*
Machine trnalsation of DE 8901726 U1, which is provided in IDS dated Oct. 29, 2014 and published Mar. 30, 1989.*
Machine translation of DE 3540164 A1, which was published May 21, 1987.*

International Search Report and Written Opinion dated May 29, 2012 for corresponding International Patent Application No. PCT/EP2012/055734, filed Mar. 29, 2012.
French Search Report and Written Opinion dated Nov. 4, 2011 for corresponding French Patent Application No. 1153048, filed Apr. 7, 2011.
International Preliminary Report on Patentability and English Translation of the Written Opinion dated Oct. 8, 2013 for corresponding International Patent Application No. PCT/EP2012/055734, filed Mar. 29, 2012.

* cited by examiner

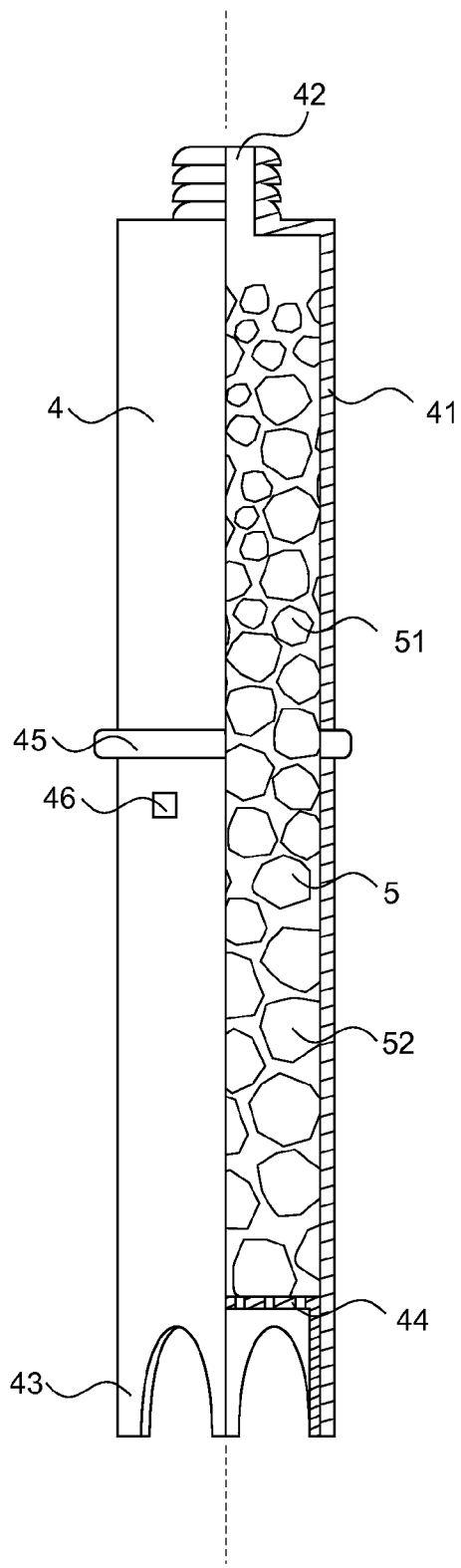
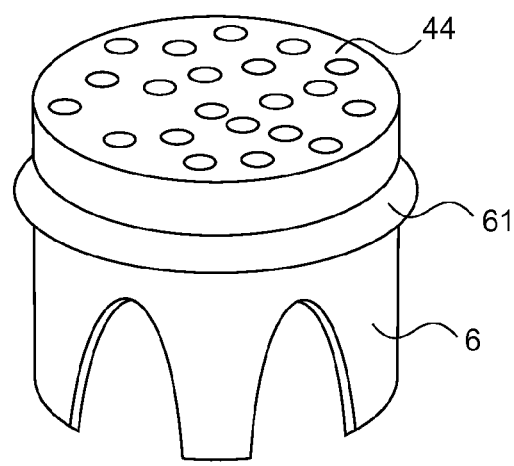
Fig. 2
Fig. 3

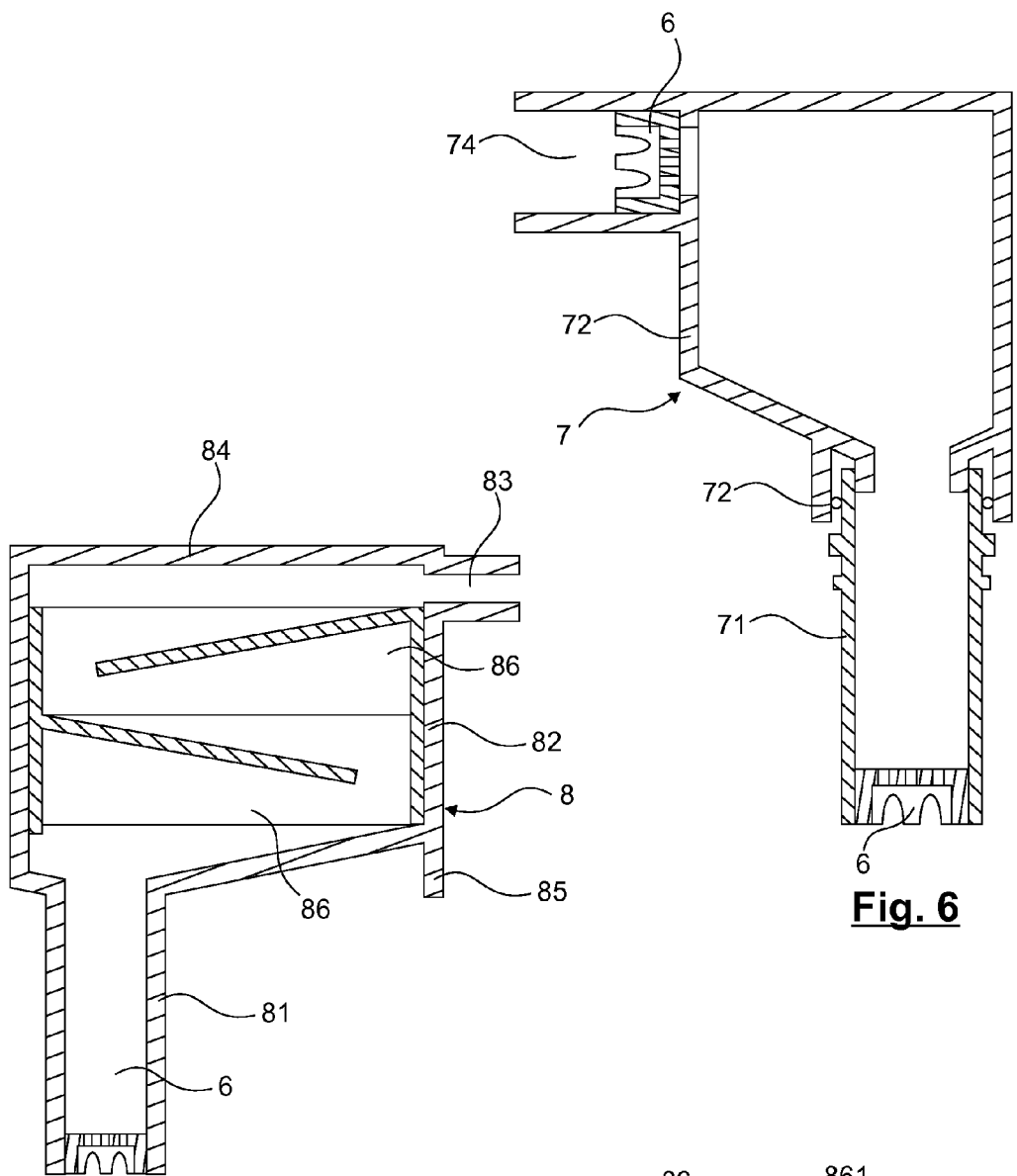
Fig. 6
Fig. 7
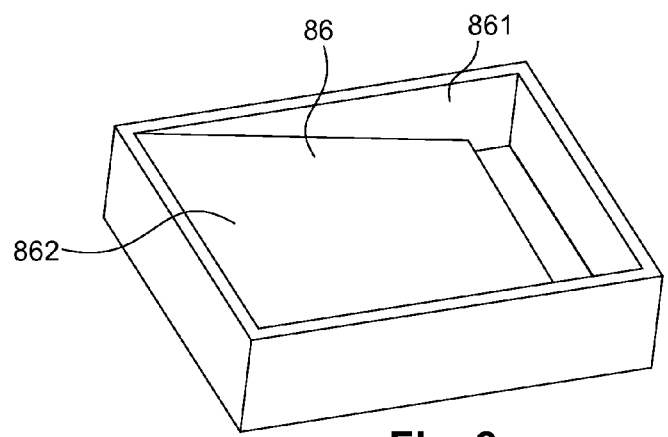
Fig. 8

# DEVICE FOR NEUTRALIZING ACID CONDENSATES

1. CROSS-REFERENCE TO RELATED APPLICATIONS

This Application is a Section 371 National Stage Application of International Application No. PCT/EP2012/055734, filed Mar. 29, 2012, which is incorporated by reference in its entirety and published as WO 2012/136577 on Oct. 11, 2012, not in English.

2. FIELD OF THE INVENTION

The present invention pertains to the discharge and treatment of acid condensates, for example condensates that can be produced in condensing boilers. The invention pertains more particularly to the treatment of these condensates in order to reduce their acidity.

3. PRIOR ART

Condensing boilers are combustion boilers that are increasingly being used especially to heat dwellings. Boilers of this type generally use gas or fuel oil as their fuel. They have the particular feature of deriving benefit from the latent heat of the steam contained in the exhaust gases, by making this steam condense in order to discharge the water, known as condensate, in liquid form. This method under certain conditions enhances the efficiency of the boiler.

Owing to the chemical composition of the fumes produced during combustion, the condensates resulting from the condensation of steam contained in the fumes are acidic. They can thus include sulfuric acid and small quantities of hydrochloric acid and nitric acid. Thus, the condensates coming from gas condensing boilers can have a pH value of 3 to 5 and the condensates obtained from fuel condensation boilers can have a pH value of 2 to 4.

After extraction from the boiler, these condensates are discharged into wastewater systems. However, their acidity can damage the piping system and is harmful to the environment. It is therefore desirable, and in certain cases compulsory, to treat these condensates in order to reduce their acidity. Such treatment must for example bring the condensates to a pH value close to neutral.

This treatment is generally done by bringing the condensates into contact with aggregates capable of reacting with the acid to neutralize it, for example limestone aggregates. Several devices of this type are known in the prior art, for example from the document FR 2 930 542.

Drawbacks of the Prior Art

These prior-art devices have several drawbacks. Firstly, the implantation, in proximity to the boilers, of a complex condensate-discharging circuit, which must often comprise, in succession, a lift pump, a siphon and an acidity neutralizer, gives rise to a high cost of installation, substantial space requirement and an increased risk of malfunction.

Secondly, the efficiency of the prior-art devices declines over time, especially because of sludging or accumulation of the sludge generated by the reaction of the acids on the aggregates. This sludging can sometimes give cause a loss of efficiency or even plugging or obstruction leading to leakages of condensates, which could cause major damage. Finally, their maintenance and especially the annual replacement of the aggregates that they contain are complicated, making it necessary to have available a suitable recharge and often requiring a dismantling of the device.

4. SUMMARY OF THE INVENTION

These goals as well as others that shall appear more clearly here below are achieve by means of a device for neutralizing acid condensates, comprising a tub for collecting condensates and a cartridge containing a reagent for neutralizing acids and having an inlet aperture for the inlet of the condensates and an outlet aperture for the outlet of the condensates, wherein according to the invention the cartridge is placed at least partly in the tub so that said outlet aperture is situated beneath a minimum level of liquid in the tub.

This position of the outlet aperture of the cartridge makes it possible to form a siphon or "siphon trap" preventing the entry of gas into the cartridge by the outlet aperture. Finally, the confinement of the reagents in a cartridge, preferably detachable, enables easy maintenance of the device.

According to one advantageous embodiment, at least a part of the reagents contained in the cartridge is placed so as to be permanently in contact with the condensates contained in the tub.

Thus, a part of the reagents can continue the reaction with the condensates if necessary, after the passage of the condensates through the cartridge.

Preferably, at least a part of the reagents contained in the cartridge is situated above a maximum level of liquid in the tub.

In this way, the condensates arriving by the inlet aperture of the cartridge arrive directly into contact with the reagents, without having been preliminarily diluted with partially treated condensates. This direct contact enhances the efficiency of the neutralizing reaction.

According to one advantageous embodiment of the invention, the device for neutralizing comprises a device for lifting the condensates collected in the tub so as to form a pump for lifting condensates.

This embodiment enables the condensates to be treated and lifted in a limited space, the same tub being used for both functions. It must also be noted that this particular embodiment enables a very easy implementation of the invention. Indeed, to obtain a device for neutralizing according to the invention, it is sufficient to place a cartridge according to the invention in the collecting tub of a pump for lifting condensates, which is known per se, and to connect the condensate lead-in pipe to the inlet aperture of this cartridge rather than to make it open directly into the tub, to obtain a device for neutralizing according to the invention.

An existing pump can thus be converted into a device combining the functions of lifting and neutralizing very easily and at lower cost. The installation of an independent device for neutralizing becomes then unnecessary. This conversion was not obvious to those skilled in the art who considered the pump and neutralizing device as distinct components of the circuit for discharging condensates.

Advantageously, this device for lifting generates movements of liquid in the tub so as to contribute to the cleaning of said outlet aperture of the cartridge and/or of reagents situated in proximity to said outlet aperture.

These movements, which are classically variations of level of liquid in the tub, enable the sludge to be driven downwards and prevent its accumulation at the bottom of the cartridge, which would cause at least partial obstruction or plugging of the cartridge.

Preferably, the reagent contained in said cartridge is formed by aggregates capable of reacting with the acids contained in the condensate, penetrating through said inlet aperture to neutralize them.

The use of aggregates enables an easy flow of the liquid through the cartridge and enables contact between this liquid and a large surface area of reagent. These aggregates can for example be constituted by calcium-based materials such as crushed marble, or they may be based on magnesium hydrolyte.

Advantageously, before the use of the cartridge, the average size of these aggregates, situated in a lower portion of the cartridge, is greater by at least 30% than the average size of the aggregates situated in an upper part of the cartridge.

Thus, it is possible in a same cartridge and when it is being filled, to combine fine aggregates in the upper portion offering a greater surface area of contact with the liquid, with bigger aggregates having larger interstices and a lower risk of plugging off the outlet aperture in the lower portion in which there could accumulate sludges resulting from the reaction between the condensates and the aggregates.

Preferably, the cartridge is placed substantially vertically in the tub, so as to enable a gravitational flow of the condensates through the cartridge.

This position of the cartridge enables efficient flow, limiting the risks of accumulation of sludges. More generally, a tilt of the cartridge of over 45° to the horizontal can enable satisfactory flow.

According to one advantageous embodiment, the cartridge is fabricated at least partly out of transparent material so as to enable a visual check on the reagent used to neutralize the acids that it contains.

The user can thus visually check that the level of reagent in the cartridge remains above a level indicated. He can also easily detect the possible accumulation of sludges in the cartridge.

Preferably, the cartridge is mounted detachably on an upper wall of the tub.

This mounting enables easy maintenance through the replacement of the cartridge when the reagent that it contains is consumed.

Advantageously, at least a part of the cartridge extends above the level of said upper wall.

According to one possible embodiment of the invention, a cartridge part extending above the level of said upper wall has a wider section than the cartridge part extending beneath said upper wall.

This assembly enables the implementation of a large quantity of reagents in one and the same cartridge.

Advantageously, the quantity of reagent in said cartridge is such that, before use, a part of the reagent extends above the level of said upper wall.

According to certain embodiments, this arrangement of the reagents enables easy visual checking of the cartridge which must be changed when the level of reagent goes below the level of this upper wall.

Preferably, the cartridge comprises support elements that rest on the bottom of said tub and enable said outlet aperture to be held at a distance from said bottom.

This disposition and more generally the keeping of the outlet aperture at a distance from the bottom of the tub limits the risk of plugging of the outlet aperture of the cartridge.

According to one advantageous embodiment of the invention, the cartridge comprises baffle means that increase the path to be traveled for the condensates in contact with said reagent for neutralizing, between said inlet aperture and said outlet aperture.

These baffle means increase the contacts between the condensates and the reagents and thus increase the efficiency of the neutralization, chiefly in the case of cartridges of great width.

Preferably, the cartridge is configured so as to enable the gravitational flow, towards said outlet aperture, of all the liquid that penetrates therein by said inlet aperture.

This configuration of the cartridge prevents any accumulation of sludges.

5. LIST OF FIGURES

The present invention shall be understood more clearly from the following description of preferred embodiments, given on an illustrative and non-exhaustive basis, along with the figures of which:

FIG. 2 is a view in partial section of a cartridge for neutralizing implemented in the pump of FIG. 1;

FIG. 3 represents a plug forming the outlet aperture of the cartridge of FIG. 2;

FIG. 6 is a view in section of a cartridge for neutralizing according to another possible embodiment of the invention;

FIG. 7 is a view in section of a cartridge for neutralizing according to one variant of the embodiment of FIG. 6;

FIG. 8 is a view in perspective of a baffle implemented in the cartridge of FIG. 7.

6. DESCRIPTION OF ONE EMBODIMENT OF THE INVENTION

Working of the Pump

Figure 1:
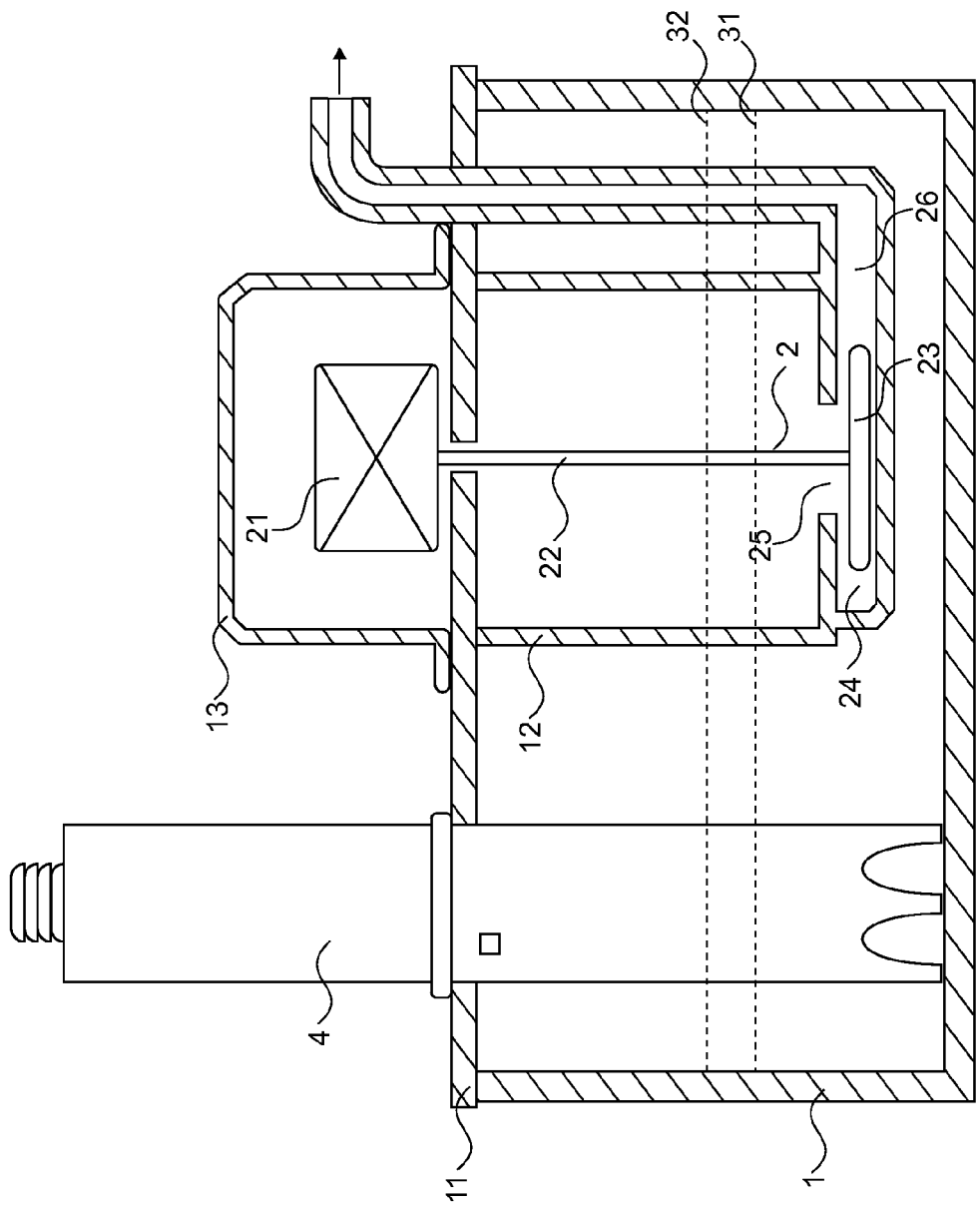
FIG. 1 is a simplified view in section of a pump for lifting condensates, forming a neutralizing device according to a first embodiment of the invention.

FIG. 1 represents a pump for lifting condensates forming a device for neutralizing according to a first embodiment of the invention. This pump comprises a tub 1 for collecting condensates and a lifting device 2 enabling the removal of the condensates collected in the tub.

This device for lifting 2 comprises, in the example shown, a motor 21 rotationally driving a shaft 22 at the end of which a turbine 23 is assembled. The turbine 23 is driven in rotation by the motor in a chamber 24 immersed in the tub 1, and in which the condensates contained in the tub 1 can penetrate by an aperture 25 situated around the shaft 22. The rotation of the turbine 23 pushes back these condensates towards a discharge tube 26 opening onto the periphery of the chamber 24 in a rotational plane of the turbine 23. Thus, the lifting device 2 removes the condensates from the tub 1 through the discharge tube 26 according to the well-known principle of centrifugal pumps.

The lifting device 2 is advantageously commanded according to the level of liquid in the tub 1. This level can be measured by means of a measuring device implementing one or more floats or by any other device known to those skilled in the art, such as for example a capacitive or resistive detection device. A command system turns the motor 21 of the pumping device 2 on or off according to the position of the floats, in such a way that the level of liquid in the tub 1 always remains between a minimum level 31 of about 40 mm and a maximum level 32 of about 60 mm, as shown in dashes in FIG. 1. Thus, this command system can put the motor 1 into operation when the level of liquid in the tub reaches the maximum level 32, which serves as the threshold for activating the pump, and keeps it in operation until the level of liquid falls back up to the minimum level 31 which serves as the threshold for stopping the pump.

The tub 1 is closed by a lid, or plate 11 which forms the upper wall of the tub and carries an open cage 12 supporting the chamber 24 of the lifting device. Besides, a hood or cover 13 can be joined to the upper face of the plate 11 to protect the motor 21 which is mounted on this plate 11.

Neutralizing Cartridge

According to the invention, the inlet of the condensates, generally coming from a boiler in the tub 1 of the pump for lifting condensates, is done through a neutralizing cartridge 4 which is therefore situated in the prolongation of the conduit for leading condensates into the tank associated with the pump.

This neutralizing cartridge 4 is represented in a non-sectioned view in FIG. 1 but in a partial section in FIG. 2. It comprises a case 41 which, in the embodiment shown, is substantially cylindrical and has apertures at both its ends capable of letting liquid pass through. This case 41 encloses a plurality of aggregates 5 capable of reacting with the acids so as to neutralize them. These aggregates can be constituted by limestone-based materials such as crushed marble or any other neutralizing means known to those skilled in the art such as for example aggregates based on magnesium hydrolyte.

At its upper end, the case 41 has an inlet aperture 42 which can advantageously form a tip on which it is possible to force-fit a tube or a flexible connector. This case 41 also comprises an outlet aperture at its lower end constituted by a screen 44 preventing the passage of aggregates but enabling the exit of liquid. This screen 44 is held at a distance from the bottom of the tub, in which the cartridge is placed, by supporting legs 43, which maintain this screen at a distance of about 10 mm from the bottoms.

According to one advantageous embodiment of the invention, this screen 44 can be formed by a lower plug 6 of the case 41 represented in FIG. 3, designed to be force-fitted on the lower end of this case 41. A peripheral boss 61 of this plug 6 can then get engaged in a complementary peripheral groove formed on the internal surface of the case 41, to block its position.

Figure 4:
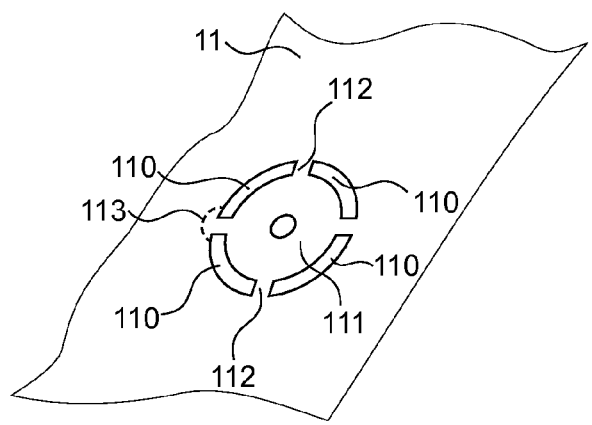
FIG. 4 is a view in perspective of a part of the closing plate for the tub of the pump for lifting condensates of FIG. 1.

As shown in FIG. 1, the neutralizing cartridge 4 is designed to be placed vertically, or substantially vertically, in the tub 1 so as to enable a gravitational flow of the condensates. Since this neutralizing cartridge 4 is intended for regular replacement, it is joined detachably to an opening of the plate 11. The plate 11, a portion of which is shown in FIG. 4, indeed comprises pre-cut slots 110 surrounding a plugging portion 111 which is connected to the rest of the plate only by strips 112. This plugging portion 111 can be easily removed, by breaking the strips 112, to form an aperture in the plate 1, the dimensions of which, defined by the pre-cut slots 110, correspond to the external diameter of the cartridge 4. The aperture formed thus enables the insertion of the lower part of the cartridge into the tub 1 through the plate 11.

The neutralizing cartridge 4 comprises a peripheral boss 45 intended to rest on the upper surface of the plate 11, around the aperture defined by the pre-cut slots 110. The distance between this peripheral boss 45 and the lower end of the cartridge 4 is advantageously defined in such a way that this lower end, formed by the legs 43, is in contact with the bottom of the tub 1 or close to it, when the boss 45 is in contact with the plate 11.

Besides, one or more pins 46 are formed on the cartridge 4 above the peripheral boss 45. These pins can penetrate the aperture defined by the pre-cut slots 110 of the plate, in passing through notches 113 that appear on the periphery of the aperture and result from the breaking of the strips 112. One of these notches is shown in dashes in FIG. 4. Once these pins 46 are introduced into the tub 1, and once the boss 45 rests on the upper surface of the plate 11, a pivoting of the cartridge 4 along its longitudinal axis makes it possible to move the pins 46 away from the notches 113 and to place these pins 46 so that they rest on the lower surface of the plate 11 so as to block the longitudinal sliding of the cartridge 4 relative to the plate 11. This detachable blocking of the cartridge 4 on the plate 11 is particularly easy to implement and requires little adaptation to equipment existing to date.

Working of the Neutralization

Once the cartridge 4 is assembled on the tub 1, a conduit for the inlet of condensates can be joined to the inlet aperture 42 of this cartridge. The acid condensates coming for example from a boiler thus arrive by the upper end of the cartridge 4 and stream on the aggregates 5. During this direct contact, the acid condensates react with the surface of the aggregates 5, generating a chemical reaction of oxidation-reduction which has the effect of reducing their acidity.

It must be noted that the fact that the condensates directly re-enter into contact with the emerged aggregates, without being preliminarily diluted in a liquid in which these aggregates might be immersed, ensures greater efficiency of neutralization of the acids.

To increase the efficiency of the neutralization of the acids, it is planned according to a preferred embodiment of the invention that the aggregates 51 situated in an upper portion of the cartridge 4 form small granular particles, for example with diameters ranging from 2 mm to 3 mm, in order to increase the surfaces of contact between the condensates and the aggregates.

The chemical reaction between the condensates and the aggregates can form sludge which risks plugging the interstices between the aggregates and thus risk plugging the cartridge 4. Besides, since the aggregates get reduced in diameter as and when they wearing out in contact with the acids, they can run the risk plugging the holes of the outlet aperture of the cartridge. To prevent such plugging; which would have damaging consequences, such as risks of leakages of condensates and poor discharge of condensates, it is planned in one advantageous embodiment of the invention that the aggregates 52 placed in a lower portion of the cartridge 4 will form big granular particles, for example with a diameter of 5 mm to 6 mm. These big granular particles, which preferably have a diameter at least twice that of the holes of the outlet aperture, do not entail any risk of plugging these holes and form major interstices between them enabling an efficient flow of the sludges generated by chemical reactions between the acids and the aggregates.

Advantageously, these big granular particles have average dimensions greater than the average dimensions of the aggregates 51 placed in the upper portion of the cartridge 4 even before the use of the cartridge. The fine granular particles placed in the upper portion of the cartridge thus make it possible, for an equal volume of aggregates, to have a greater surface of contact between the condensates and the aggregates. However, it is important that the fine granular particles should not have a diameter below one-tenth of the diameters of the big granular particles so that they do not flow in the interstices between the big granular particles.

The combination of big granular particles in a lower portion of the cartridge through which the liquid exits and of finer granular particles, preferably finer by at least 30%, in an upper portion of the cartridge, through which the liquid enters, therefore ensures both greater efficiency of the neutralization of the acids and a reduction of the risk of clogging of the neutralization device. It must be noted that such a cartridge has aggregates, the average size of which in an inlet portion of said cartridge is smaller than the average size of the aggregates situated in a lower portion of said cartridge, and could therefore advantageously be used in other types of devices for neutralizing condensates than that of the invention.

As shown in FIG. 1, the bottom of the neutralizing cartridge 4 is situated above the minimum level 31 of liquid in the tub 1. Since this minimum level corresponds to the level at which the pump stops, there is permanently a minimum quantity of liquid in the tank, corresponding to this minimum level. In this way, the aggregates situated at the bottom of the cartridge are permanently immersed. Since the level of liquid in the tub 1 varies regularly between its lower level 31 and its upper level 32, this variation in level causes a shifting of liquid providing for the regular washing of the aggregates situated at the bottom of the cartridge, thus limiting risks of clogging.

Besides, since a lower part of the aggregates remains permanently in contact with the condensates contained in the tub, the reaction between these aggregates and the condensates can continue if the condensates contained in the tub are still acidic.

According to another possible solution of neutralizing, which is not shown and is not an object of the claims, the cartridge 4 can also be placed in the tub to neutralize the condensates that it contains, without having condensates that penetrate the tub pass through it.

This solution of neutralization can be done with a cartridge as described in the different embodiments of the present invention (in which the inlet aperture of condensates would however not be necessary). It can be implemented complementarily to the use, according to the invention as described in the present application, of another cartridge passed through by condensates or can be implemented independently, for example in the case of a low flow rate of condensates that does not require great efficiency of neutralization.

Thus, this solution of neutralization, which is not an object of the claims, would implement a device for neutralizing acid condensates comprising a tub for collecting condensates and a cartridge containing a reagent for neutralizing acids and having an aperture permeable to liquids but blocking the reagent, said cartridge being placed at least partly in said tub so that said aperture is beneath a minimum level of liquid in said tub and is at a distance from the bottom of the tub.

This solution of neutralization would have the advantage, as compared with the prior-art solutions, of preventing the accumulation of sludge with the aggregates, since the sludge can fall into the tub owing to the distance between the bottom of the tub and the outlet aperture of the cartridge. It would also have the advantage of providing neutralization over a lengthy period because of the large quantity of aggregates that can be contained in the cartridge. Besides, the disposition of the aggregates in the cartridge would facilitate their replacement during the maintenance operations.

In the embodiment of the invention shown in FIG. 1, the outlet aperture (or apertures as the case may be) of the cartridge 4 are situated beneath the minimum level of the liquid 31 in the tub 1 and therefore permanently immersed. Thus, the device for neutralizing according to the invention forms a siphon preventing gas from entering the boiler through the conduits for discharging the condensates. Such a siphon is generally needed in the condensate-discharging conduits of condensing boilers. Since the device for neutralizing condensates according to the invention fulfils this function, it makes the installation of an additional siphon on the conduit superfluous and thus simplifies the installation of the boiler. Besides, since the tub 1 contains a large quantity of liquid, the risk that it will get dried is low. The device for neutralizing according to the invention therefore forms a particularly well-performing siphon.

The chemical reaction between the acids and the aggregates gives rise to a gradual destruction of these aggregates. To preserve high efficiency of neutralization of the acids, therefore, these aggregates must be replaced regularly, for example every year. Advantageously, the case 41 of the neutralizing cartridge 4 is fabricated out of a transparent material, for example a transparent plastic. Thus, it is possible for the user to check the level of aggregates in the part of the cartridge 4 that goes above the plate 11. Thus, by a simple visual check that requires no dismantling, the use can know the time at which the cartridge 11 must be replaced to maintain an efficient level of neutralization. It can for example be recommended that this cartridge be replaced when the level of aggregates falls below the plate 11 (by a visual check without dismantling).

The replacement of the aggregates can be done in a very simple and speedy manner by dismantling the cartridge 4 and by replacing it with a new cartridge. The cartridge model can advantageously be standardized for the different models of pumps and condensate neutralizers.

In the embodiment described with reference to FIG. 1, the device for neutralizing according to the invention forms a pump for lifting condensates. This integration of the cartridge into the pump procures an advantage of compactness which simplifies the assembly. Naturally, if this embodiment implements a centrifuge-type pump, any other type of pump known to those skilled in the art can of course be implemented such as for example an oscillating piston pump, a peristaltic pump, a diaphragm pump, etc.

Another Embodiment

Figure 5:
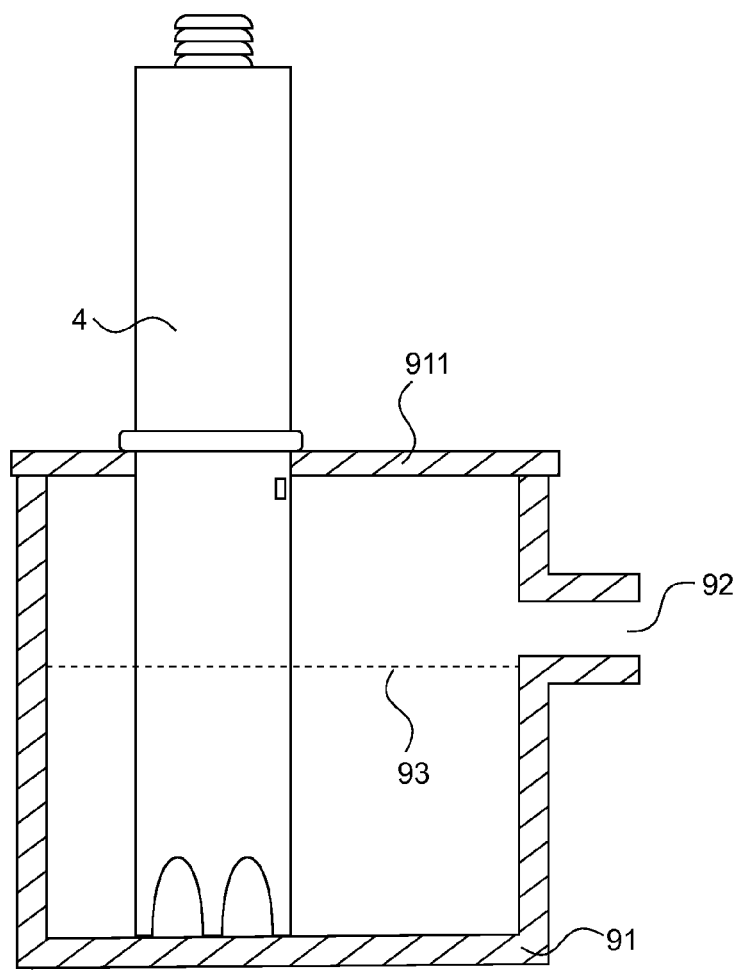
FIG. 5 is a view in section of a device for neutralizing condensates according to a second possible embodiment of the invention.

FIG. 5 represents an alternative embodiment of the invention, that can be implemented in systems in which the condensates are discharged gravitationally, without its being necessary to carry out a lifting by a pump. As can be seen in FIG. 5, the system for neutralizing comprises a tub 91 closed by a plate 911. A cartridge 4, identical to the one implemented in the pump for lifting condensates of FIG. 1, is joined to the plate 911, for example with a joining identical to the one implemented between the cartridge 4 and the plate 11, in the same way as in the joining of this cartridge with the plate 11.

The tub 91 has an aperture 92 enabling the discharge of the condensates collected in the tub 91. The height of this aperture 92 is chosen so that the level of liquid 93, shown in dashes in FIG. 5, remains permanently above the lower aperture of the cartridge 4. Thus, this system of neutralization shown in FIG. 5, provides simply for an efficient neutralization of the acid and a siphon preventing gas from entering the heating unit of the boiler. Besides, the maintenance of this device for neutralizing acid is particularly simple, as in the embodiment shown in FIG. 1.

According to other possible embodiments of the invention, the neutralizing cartridge can have a different shape. It is for example possible for the upper part of this cartridge, which is to remain above the plate 11, to have greater dimensions in order to contain more aggregates, the lower part of the cartridge being identical to that shown in FIG. 2, in order to remain compatible with the tub 1 and the plate 11. FIGS. 6 to 8 thus represent two possible embodiments of the invention enabling the implementation of more aggregates to increase the neutralization performance values.

FIG. 6 thus represents a cartridge 7 for neutralizing comprising a lower cylindrical-case portion 71 similar to the lower part of the case 41 of the cartridge 4. This lower case portion 71, which for example can be fabricated by cutting out a case 41, can advantageously be closed at its lower end by the same plug 6, and comprise the same bosses and pins as the case 41, enabling the attachment to the plate 11. Thus, the neutralizing cartridge 7 can advantageously be joined with a pump or a tub exactly in the same way as the cartridge 4.

The upper part of the neutralizing cartridge 7 is constituted by a chamber 72 having dimensions enabling the cartridge 7 to contain a greater quantity of aggregates than the cartridge 4. According to one possible embodiment, the joining between the lower part of the cases 71 and the chamber 72 can be done by nesting, enabling the lower case portion 71 to rotate about its longitudinal axis, relative to the chamber 72. In this embodiment, which in certain situations, facilitates joining to a pump or to a tub, a seal 73 can be planned between the two portions of the cartridge. In other possible embodiments, these two portions can for example be glued or they can be fabricated as a single part, as can be seen for example in FIG. 7.

The neutralizing cartridge 7 comprises a lateral condensate inlet aperture 74. To prevent the exit of aggregates through it, this aperture can advantageously be plugged by a plug 6 identical to the one that plugs the condensate outlet aperture, letting liquids but not aggregates pass through.

It must be noted that the shape of the chamber may be any shape in order to obtain the invention. It can thus be a cylinder with a diameter greater than that of the lower case portion, have a rectangular shape or for example form a spirally wound tube. This shape must however enable the downward flow of the liquids that are introduced therein and must have walls that are sufficiently inclined to prevent the accumulation of sludge in the cartridge.

The neutralizing cartridge 8 according to the variant shown in FIG. 7 also has a lower case portion 81 closed off by a plug 6 and surmounted by a chamber 82. This chamber 82 has a rectangular section and is closed by a tightly-sealed detachable lid 84. Advantageously, it contains a plurality of baffles 86.

These baffles 86, one of which is shown in FIG. 8, have a frame 861 holding a tilted plane 862. These tilted planes, in the chamber 82, force the liquids entering the chamber by the inlet aperture 83 to travel on a longer path, in contact with the aggregates filling the chamber, before reaching the outlet aperture of the cartridge 8. The baffles 86, which can be used in variable number depending on the dimensions of the chamber, therefore enable a more efficient neutralization. To prevent deposits of sludges on the tilted planes, it is important that these should preserve sufficient inclination, for example of the order of 10°, to the horizontal.

It must be noted that the cartridge 8 has a prop 85 enabling it to rest in a stable manner on the plate in which it is mounted. According to one particular embodiment, this prop can be provided with a centering system on the plate to prevent the rotation of the cartridge 8 about the lower case portion 81. In another embodiment that can be envisaged, a same chamber could be associated with several lower supporting parts engaged in the same plate, to enable a better flow rate and an addition guarantee against the risk of plugging of the outlet aperture.

Those skilled in the art could implement other variants of the present invention without difficulty to adapt to particular situations. They could thus implement cartridges of varied shapes, and adapted baffles, for example helical-shaped baffles for cylindrical chambers, etc.

An embodiment of the present invention is aimed at overcoming drawbacks of the prior art.

In particular, an aim of an embodiment of the present invention is to provide a device for neutralizing acid condensates that makes it possible to efficiently raise the pH value of the condensates.

It is a particular goal of the invention, in at least one of its embodiments, to provide a device of this kind in which the risk of accumulation of sludges generated by the neutralization of acid condensates is reduced.

It is another goal of the invention, according to at least certain embodiments, to provide a device of this kind that enables a simplification of the circuit for removing condensates from the boiler.

It is yet another goal of the invention to provide a device of this kind that can be easily installed and maintained.

The invention claimed is:

1. A device for neutralizing acid condensates, comprising:
a tub configured to collect condensates; and
a cartridge enclosing a reagent configured for neutralizing acids, wherein the cartridge has an upper end with an inlet aperture for inlet of the condensates and a lower end with an outlet aperture for outlet of the condensates, wherein said cartridge is mounted detachably on an upper wall of said tub, and wherein said outlet aperture is placed in said tub so that said outlet aperture is situated beneath a minimum level of liquid in said tub.

2. The device for neutralizing condensates according to claim 1, wherein at least a part of the reagent contained in said cartridge is placed so as to be permanently in contact with the condensates contained in the tub.

3. The device for neutralizing condensates according to claim 1, wherein at least a part of the reagent contained in said cartridge is situated above a maximum level of liquid in said tub.

4. The device for neutralizing condensates according to claim 1, wherein the device comprises a lifting device configured to lift the condensates collected in said tub so as to form a pump for lifting condensates.

5. The device for neutralizing condensates according to claim 4, said lifting device generates movements of the liquid in said tub so as to contribute to cleaning of said outlet aperture of said cartridge and/or movements of the reagent situated in proximity to said outlet aperture.

6. The device for neutralizing condensates according to claim 1, wherein said reagent contained in said cartridge is formed by aggregates capable of reacting with the acids contained in the condensates penetrating by said inlet aperture to neutralize them.

7. The device for neutralizing condensates according to claim 6, wherein, before use of the cartridge, an average size of the aggregates, situated in a lower portion of said cartridge, is greater by at least 30% than an average size of the aggregates situated in an upper part of said cartridge.

8. The device for neutralizing condensates according to claim 1, wherein said cartridge is placed substantially vertically in said tub, so as to enable a gravitational flow of the condensates through said cartridge.

9. The device for neutralizing condensates according to claim 1, wherein said cartridge is fabricated at least in part out of transparent material so as to enable a visual checking of the reagent for neutralizing the acids contained by the cartridge.

10. The device for neutralizing condensates according to claim 9, wherein at least a part of the cartridge extends above a level of said upper wall.

11. The device for neutralizing condensates according to claim 10, wherein a cartridge part extending above the level of said upper wall has a wider section than a cartridge part extending beneath said upper wall.

12. The device for neutralizing condensates according to claim 10, wherein a quantity of reagent in said cartridge is such that, before use, a part of the reagent extends above the level of said upper wall.

13. The device for neutralizing condensates according to claim 1, wherein said cartridge comprises support elements that rest on a bottom of said tub and enable said outlet aperture to be held at a distance from said bottom.

14. The device for neutralizing condensates according to claim 1, wherein said cartridge comprises baffles that increase a path to be traveled for the condensates in contact with said reagent for neutralizing, between said inlet aperture and said outlet aperture.

15. The device for neutralizing condensates according to claim 1, wherein said cartridge is configured so as to enable the gravitational flow towards said outlet aperture of all the liquid that penetrates therein by said inlet aperture.

* * * * *